H. MITCHELL.
Corn Planter.
No. 79,588.
Patented July 7, 1868.
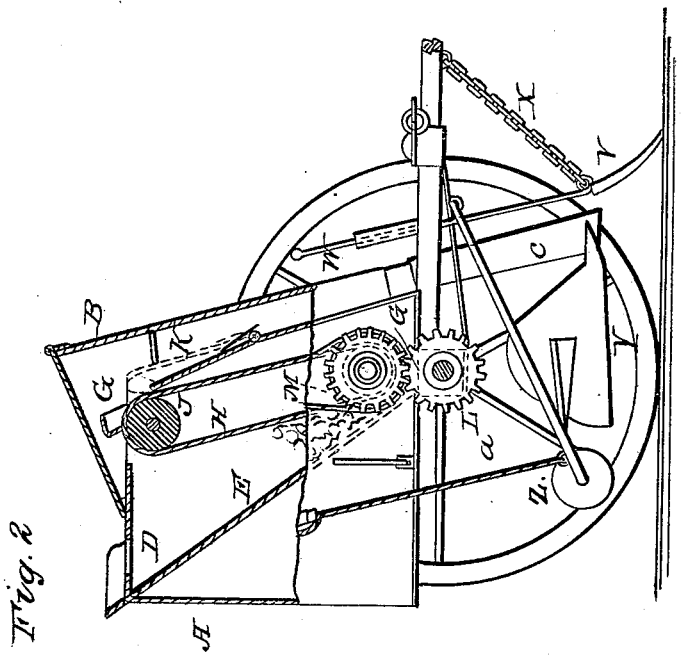
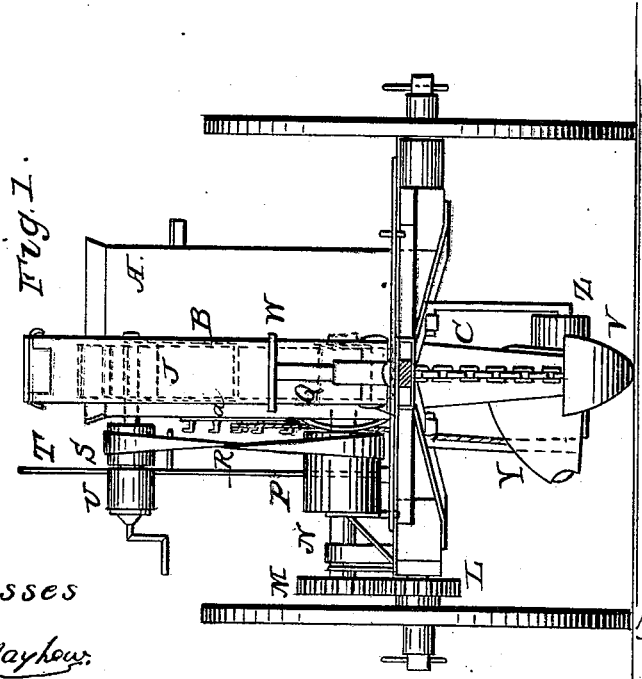

United States Patent Office.

HENRY MITCHELL, OF OSBORN, OHIO.

*Letters Patent No. 79,588, dated July 7, 1868.*

IMPROVEMENT IN CORN-PLANTER.

*The Schedule referred to in these Letters Patent and making part of the same.*

TO ALL WHOM IT MAY CONCERN:

Be it known that I, HENRY MITCHELL, of Osborn, Greene county, and State of Ohio, have invented an Improved Corn-Planter; and I hereby declare the following to be an exact description thereof, reference being had to the accompanying drawings, and to the letters of reference marked thereon, making a part of this specification, in which—

Figure 1 is a front elevation of the corn-planter.

Figure 2 is a sectional side elevation.

The nature of my invention is the construction and operation of the devices inside of a peculiarly-shaped corn-box or hopper, namely, an endless belt, revolving vertically on rollers, having elevators for picking up the corn in any desired amount or number of grains, and a valve, compelling the elevators to discharge the corn through the tube beneath; also the construction and combination of the upright belt, rollers, and cog-gearing, with upright lever, all arranged on the outside of the box, by means of which the operator regulates the operation of the machine, so as to commence or cease the dropping of the corn; also the construction and mode of operating the plows and roller, for the purpose of furrowing, covering, and rolling the ground, with cords and hooks for the purpose of regulating the covering of the seed to the desired depth.

A represents the upright corn-box or hopper, nearly square, wider below than above, with a chamber, B, in front, through which the corn is discharged into the tube C below.

D is the aperture, through which the corn is emptied into the box A, the corn falling down, over the inclined partition E, to the bottom of the box, where there are two elevators, G G, attached to the endless belt H, that pick up the desired amount of corn, carrying the corn upwards, around the upper roller J, until the elevator reaches the valve K, that presses the elevator forward, and empties the corn into the chamber B, by which means the corn is deposited through the tube C in each hill, at equal distances apart; and after the valve K has compelled the elevator to discharge the corn, the elevator continues to revolve around with the belt, and thus continuing the feeding operation.

L is the driving toothed wheel, that gears into the cog-wheel M, that revolves the shaft N, that operates the band-wheel P and roller Q, which is the lower roller on the inside of the corn-box, around which the belt H revolves.

The belt or strap R, revolving on the band-wheel P, on the outside of the box, gives motion to the upper rollers S and J, that keep the machine in operation, and by means of the lever T the belt R is shifted outward upon an independent or loose pulley, U, which ungears the seeding-devices, and the operation of seeding is stopped whenever required.

The depth of the furrow is regulated by raising or lowering the front plow V, by means of the upright lever W. The chain X braces the front plow V.

The scraper Y and roller Z are fastened to a swinging frame, underneath the machine, that is raised or lowered to the proper height, whenever required, by rope *a* passing up through the platform of the machine, and held by hooks in the side of the box.

What I claim as my invention, and desire to secure by Letters Patent, is—

1. The construction of the belt H, elevators G G, rollers J and Q, and valve K, when arranged, combined, and operating as herein described and for the purpose set forth.

2. I also claim the shape and construction of the corn-box A, with its chamber, B, in front, and discharge-pipe C at the bottom of the chamber, substantially as set forth.

3. I also claim the rollers P, U, and S, belt R, shifting-lever T, rollers Q and J, when arranged and operated as herein described and for the purposes set forth.

4. I also claim the arrangement of the plow V, with its adjustable lever W, brace-chain X, scraper Y, and roller Z, when regulated and operated on the under side of the machine, as herein described and for the purpose set forth.

HENRY MITCHELL.

Witnesses:
A. M. CHANDLER,
D. MARTIN.